May 1, 1928.
L. G. COPEMAN
1,667,720
METHOD OF MAKING MATCH PLATE PATTERNS
Filed May 29, 1925     5 Sheets-Sheet 1
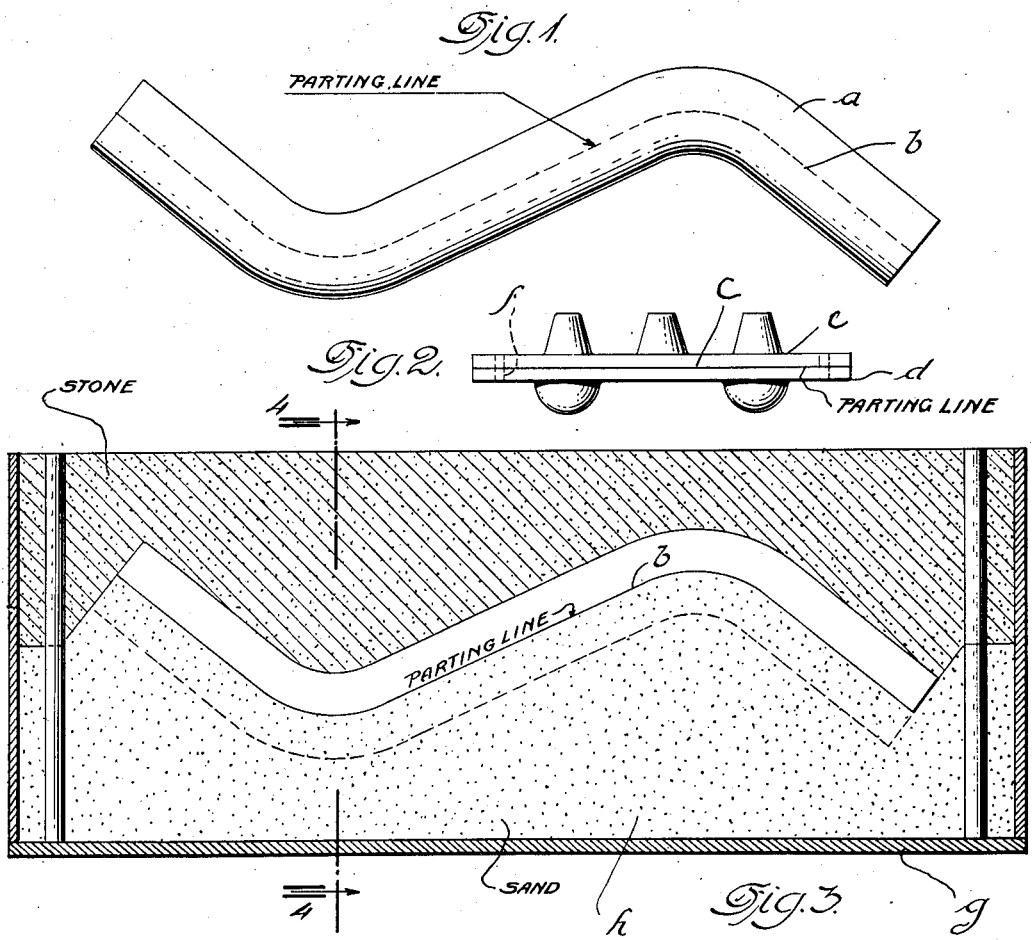
INVENTOR:
Lloyd G. Copeman
BY
Stuart C. Barnes
ATTORNEY.

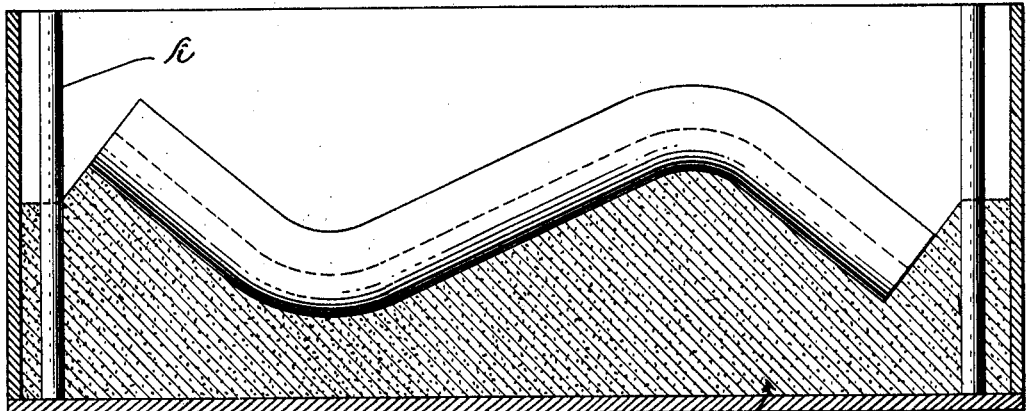
Fig. 5.
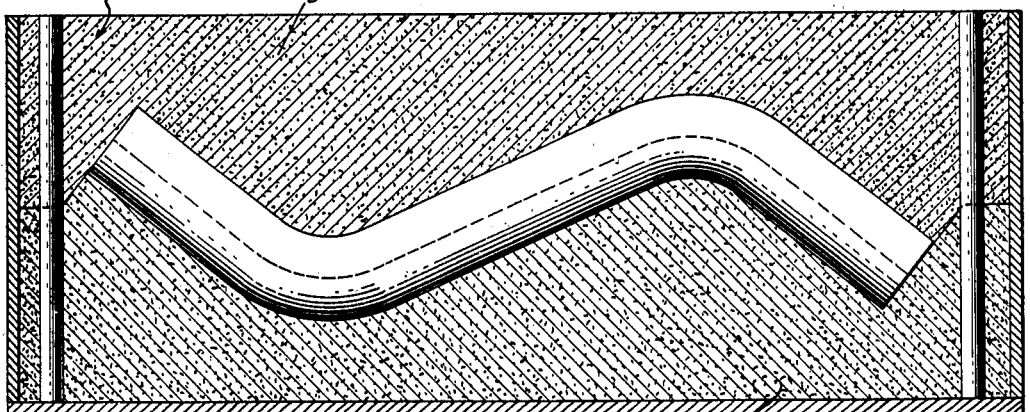
Fig. 6.
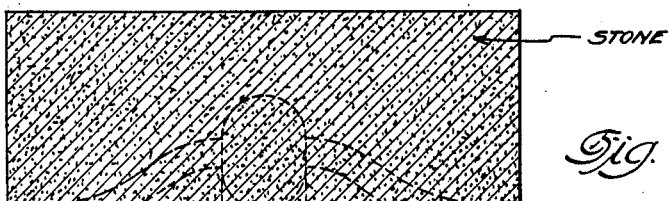
Fig. 7.
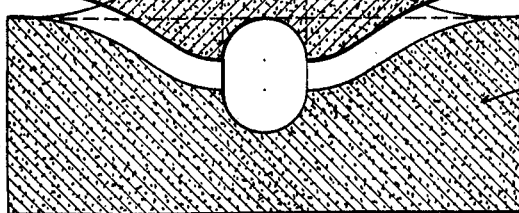
INVENTOR:
Lloyd G. Copeman
BY
ATTORNEY.

May 1, 1928. 1,667,720
L. G. COPEMAN
METHOD OF MAKING MATCH PLATE PATTERNS
Filed May 29, 1925 5 Sheets-Sheet 3

INVENTOR:
Lloyd G. Copeman
BY
Stuart C. Barnes
ATTORNEY.

May 1, 1928.
L. G. COPEMAN
1,667,720
METHOD OF MAKING MATCH PLATE PATTERNS
Filed May 29, 1925     5 Sheets-Sheet 4
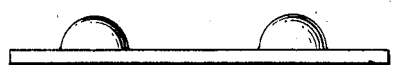
ORIGINAL PATTERN
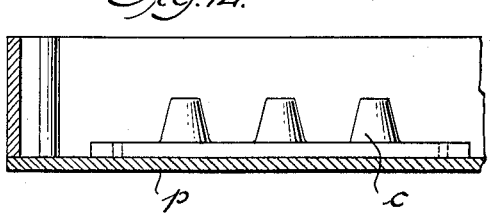
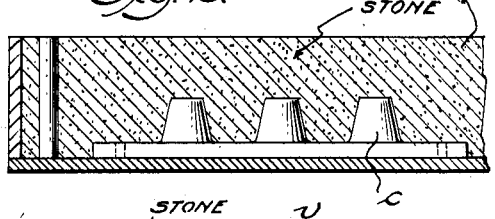
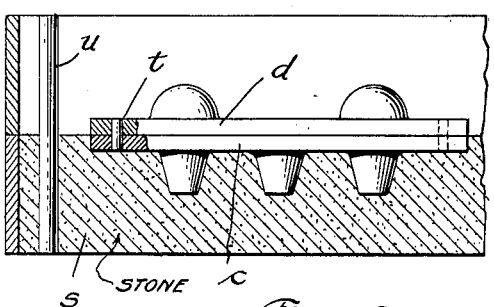
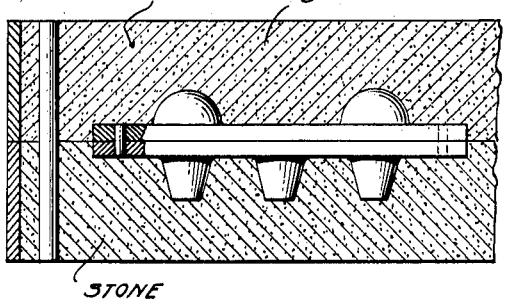
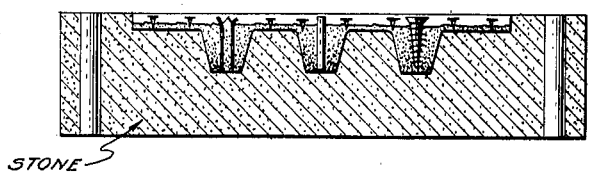
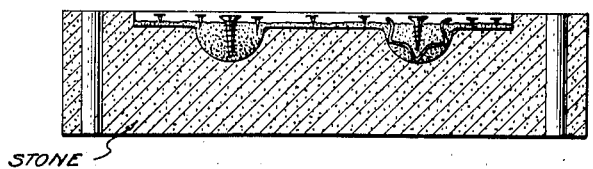
INVENTOR:
Lloyd G. Copeman
BY
Stuart C. Barnes
ATTORNEY.

May 1, 1928.

L. G. COPEMAN 1,667,720

METHOD OF MAKING MATCH PLATE PATTERNS

Filed May 29, 1925 5 Sheets-Sheet 5

INVENTOR:
Lloyd G. Copeman
BY
ATTORNEY.

Patented May 1, 1928.

1,667,720

UNITED STATES PATENT OFFICE.

LLOYD G. COPEMAN, OF FLINT, MICHIGAN, ASSIGNOR TO COPEMAN LABORATORIES COMPANY, OF FLINT, MICHIGAN, A CORPORATION OF MICHIGAN.

METHOD OF MAKING MATCH-PLATE PATTERNS.

Application filed May 29, 1925. Serial No. 33,648.

This invention relates to a method of making match plate patterns, and has for its object a means of manufacture which permits a match plate pattern to be more quickly and accurately made.

The present way in which a match plate pattern is made is by making a metal casting. Due to the shrinkage and warping, this casting is made sufficiently greater than the master pattern to permit a workman to finish off the pattern and dress it down until it corresponds to the original. This is a slow process, is very difficult, and necessitates the employment of very highly skilled workmen. When the pattern is very complicated it is well nigh impossible to obtain a perfect match plate. With my improved process, however, a perfect match plate is reproduced and the moulds from which said match plates are reproduced remain good indefinitely, and other match plates may be cast from these moulds at any time, and it is found that all the match plates are accurate and exactly like the preceding one.

Where a master pattern is provided with a straight parting line, it does not require the same amount of skill as it does to produce a match plate pattern from a master pattern where the parting line is irregular or curved.

In the drawings:

Fig. 1 is a view in elevation of a master pattern having an irregular parting line.

Fig. 2 is an elevation of a master pattern having a straight parting line.

Fig. 3 is a vertical sectional view through a box showing the pattern placed therein and the sand packed in the box up to the parting line, and a plastic stone mix poured in above the said.

Fig. 4 is a section on the line 4—4 of Fig. 3.

Fig. 5 is a view of the stone mould section and pattern set therein with the sand removed, and the position of the mould reversed.

Fig. 6 is a section showing the plastic stone mix poured into the box to form the other mould section.

Fig. 7 is a cross section showing the mould sections slightly separated.

Figs. 12 and 13 are views in elevation of the master pattern as shown in Fig. 2, and showing the two parts of the pattern separated.

Fig. 14 is a section of one of the halves placed into a box.

Fig. 15 is a similar section showing the plastic stone mix poured therein.

Fig. 16 is a vertical section through the box and showing the other half of the pattern secured to the first mentioned half which still remains in the stone.

Fig. 17 is a similar section showing the plastic stone mix poured over the stone mould section and pattern guided thereby.

Fig. 18 is a vertical section through one of the stone mould sections, showing the process of pre-setting part of the pattern in the moulds by pouring in a plastic stone mix, and allowing the same to be partially set.

Fig. 19 is a sectional view through the other mould section, showing this pre-setting operation of the stone.

$a$ designates a master pattern having an irregular parting line $b$. Fig. 2 shows another master pattern which comprises two halves $c$ and $d$, and which has a straight parting line $e$. These two halves are held together by means of the dowels $f$.

The first step may be best described by using the master pattern, which has an irregular parting line. The pattern is placed in a box $g$ and the sand $h$ is packed around the pattern up to the parting line $b$, the plastic stone, or other composition material, is poured in the box over the sand, and the pattern which, when hardened, forms the stone mould section $i$, in which half of the pattern is impressed. This is more clearly shown in Fig. 4. The stone mould section and pattern carried thereby is inverted, the sand removed from the box, as shown in Fig. 5, and then more plastic stone is poured in the box, which when hardened forms a complementary stone mould section $j$. In casting these stone mould sections a parting material of oil, or any suitable material is used, so that when the stone is cast on stone, the same will not stick.

Fig. 7 shows the mould sections when slightly separated after the withdrawal of the master pattern. This clearly shows how one half of the master pattern is impressed in each mould section. Because of the fact that the mould section $j$ is cast on the mould $i$ and the pattern is fitted therein, these mould sections will always fit together and the large pins $k$ which are cast directly in the mould sections which are withdrawable and leave a hole within the mould sections so that they can always be re-located in the exact position by doweling the same together.

Figure 8:
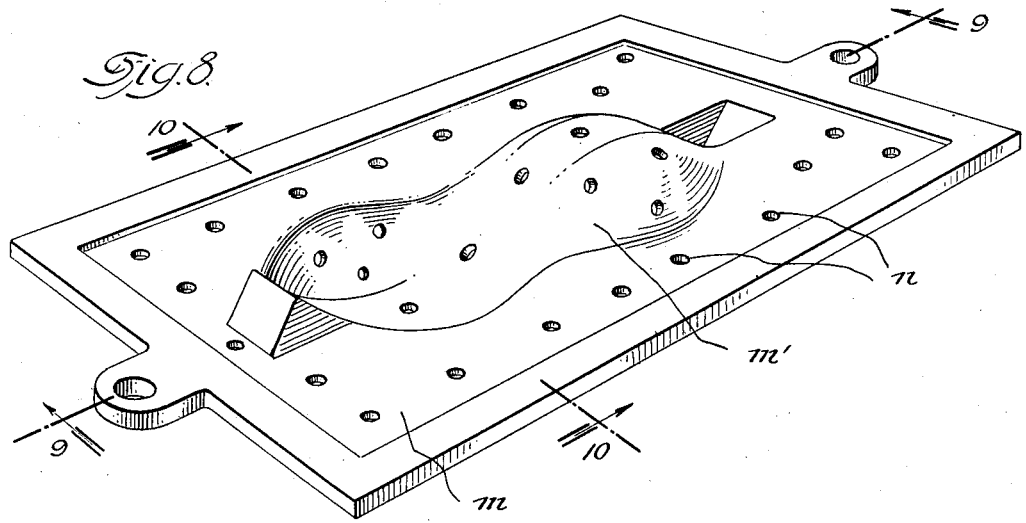
Fig. 8 is a perspective view of the reinforcing match plate.
Figure 9:
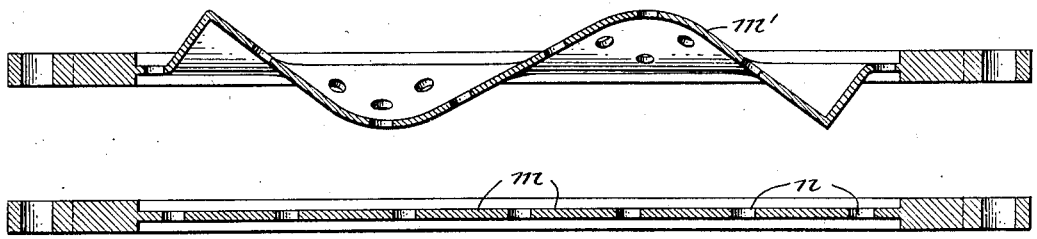
Fig. 9 is a section taken on the line 9—9 of Fig. 8.
Figures 10, 11:
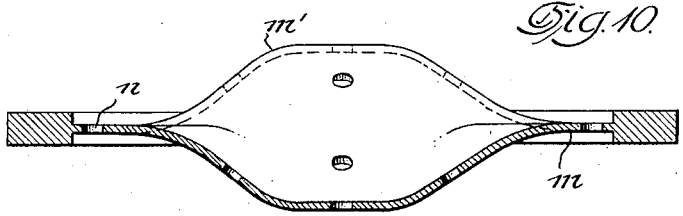
Fig. 10 is a section on the line 10—10 of Fig. 8.
Fig. 11 is a vertical section through a straight or plain match plate.

The next step in the manufacture is the casting of the pattern from these mould sections onto a metal match plate. Obviously other materials than metal could be used for the match plate, if desired, it being merely necessary that the match plate be rigid and capable of reinforcing the match plate pattern. Fig. 8 shows a match plate $m$ provided with an irregular surface $m'$, which conforms to the parting line of the master pattern. This match plate is provided with a plurality of holes $n$ for a purpose later to be described.

Figure 21:
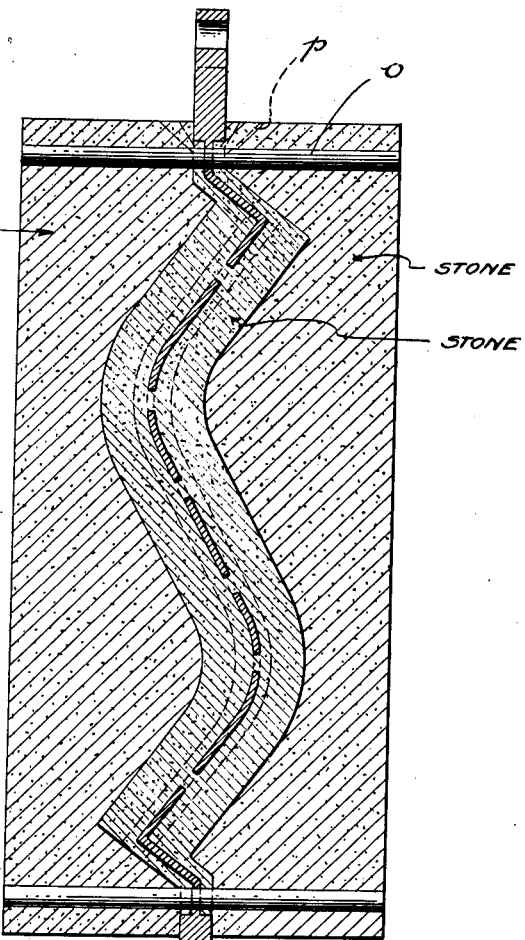
Fig. 21 is a view similar to Fig. 20, but shows the mould sections which form a pattern conforming to the master pattern having an irregular parting line.

In Fig. 21, the mould sections are shown fitted together and located properly by the dowel pins $o$. The match plate $m$ is fitted between the mould sections, the plate proper being spaced from the mould sections to permit a plastic stone mix to be poured therein through the sprue openings $p$. This plastic mix when hardened forms a stone pattern. Due to the fact that this stone mix flows through the holes $n$ in the match plate, the stone is keyed to the match plate and cast-united therewith.

Figure 22:
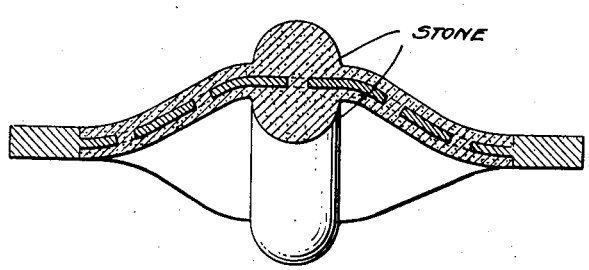
Fig. 22 is a transverse sectional view through a match plate pattern having an irregular parting line.

Fig. 22 shows a cross section through such a match plate and it clearly shows how one half of the pattern of composition material is cast on one side of the match plate and the other half on the other side of the match plate.

When using a pattern which has a straight parting line, I first split the pattern as shown in Fig. 2, and take first the part $c$, place the same in a box and then pour the plastic stone mix over the half of the pattern, as shown in Fig. 15, which, when hardened, forms a stone mould section $s$. I next invert this stone mould section and leave the pattern half $c$ therein. By means of the dowel pins $t$ the pattern half $d$ is secured to the pattern half $c$, the long dowels $u$ which are cast in the stone mould $s$ sticking up as shown in Fig. 18. A plastic stone mix is now poured in the box over the pattern part $d$ and stone mould section $s$, and when hardened form a second stone mould section $v$. The dowels $u$ are removed leaving holes in the mould sections so they can be relocated at any time with the use of long dowel pins.

Figure 20:
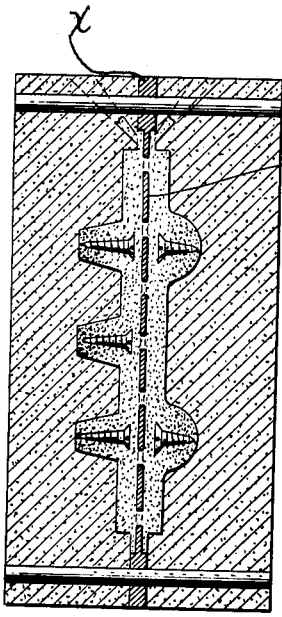
Fig. 20 is a vertical section through the mould sections when brought together and showing the metal match plate and the stone pattern cast on both sides thereof.

In forming the match plate patterns from these mould sections I preferably form a pattern having various densities. I first turn the mould sections face up as shown in Figs. 18 and 19, and pour in a plastic stone mix and permit the same to partially set, so that the same will not run when the mould sections are tipped up. During this time which I call the presetting operation the heavier particles of the mix will sift to the bottom, as shown by the shading in Figs. 18 and 19, and this will make a denser composition at the bottom which happens to be the wearing surface of the pattern. Fig. 20 shows these mould sections fitted together and having the match plate $w$, which is in one plane, fitted therebetween, and the final plastic stone mix is poured through the sprue openings $x$ in the mould sections, and when hardened forms a match pattern which reproduces the master pattern exactly.

Various mixes or compositions could be used for this purpose, but I choose to use an oxy-chloride cement which comprises a mixture of 20% magnesium oxide by weight, 30% finely ground silica by weight, and 50% 50-mesh silica sand by weigh. To this dry mix is added sufficient magnesium chloride in solution to form a plastic mix which may be readily poured. During the pre-setting of the cement, which is poured in the mould sections as shown in Figs. 18 and 19, the sand is the heavier part of the mix and it is this sand which sifts to the bottom thereby providing a harder and denser wearing surface for the pattern.

I find it advantageous in casting a pattern from the stone mould sections to first paint them with a considerably thinner solution of the mix above referred to. This serves to prevent the forming of air pockets in the surface, and also tends to avoid a wavy surface due to the pouring mix lapping over itself, so to speak, in flowing into place.

As explained in connection with securing a denser surface, I find it advantageous to pour part of the mix into the deepest cavities of the mould sections. This is allowed to partially set before the mould sections are placed together for the final pour. It is at this time that reinforcing studs or members may be inserted in the deep cavities which are to form the projecting parts on the pattern.

This process for making a match plate pattern can obviously be carried out with slight modification in making a pattern which is fastened to only one side of the plate as is very often done with heavy castings where a plate is used for each side of the pattern. In such a case the pattern can be cast onto only one side of the plate by providing suitable projections on the plate tied to the pattern. I desire it to be understood that this form of plate comes within the scope of my invention. I also wish it understood that I use the term "plate" in its very broadest signification; that this plate may become so thoroughly perforated as to be in fact a mesh; such a mesh construction is described in my copending application Serial No. 42,940, filed July 11, 1925. The present application is intended to be a generic one and the term "plate" is used to mean any reinforcing member which is placed within the stone casting to give the match plate pattern tensile strength.

The master pattern referred to may be either the original wooden pattern or if the wooden pattern is covered with an objectionable shellac that might make it stick in the stone moulds, I can first make an impression of the wooden pattern in plaster of Paris and from this plaster of Paris mould cast an exact reproduction of the wooden pattern by means of my oxy-chloride mix. This reproduction of the wooden pattern then becomes the master pattern to be used in forming the stone moulds.

What I claim is:

1. A method of making match-plate patterns, which comprises the placing of a master pattern in a box, the packing of sand around the said pattern to a level with the parting line, the pouring of a plastic stone over said sand and master pattern to form an artificial stone mould section, the removing of said sand and inverting the stone mould section and master pattern, the pouring of a plastic stone over said stone mould section and master pattern to form a second stone mould section complementary to the first mentioned cast stone section, the fitting together of said mould sections in spaced relation with each other, the inserting of a metal match-plate between said mould sections, and the pouring of a plastic stone mix in said mould sections and around said match plate, which when hardened forms a reinforced stone match plate pattern.

2. A method of making patterns, which comprises the partial filling of mould sections with a plastic composition material while the mould sections are turned face up, the partial setting of said plastic material, the fitting the same together, and the pouring of a plastic mix in said mould formed by said mould sections to complete the pattern.

3. A method of making patterns, which comprises the painting of mould sections with a thin solution of stone mix, the partial filling of mould sections with a plastic cementitious material while the mould sections are turned face up, the fitting the same together, and the pouring of plastic cementitious mix in said mould formed by said mould sections to complete the pattern.

4. The method of forming match plate patterns, which comprises placing a master pattern in a mould box supported by a body of sand, pouring a mouldable material over said sand and master pattern to form a mould section, removing the sand and replacing the same with a mouldable material and then removing the master pattern and inserting a reinforcing match plate and pouring a plastic material around said match plate to form the match plate pattern.

5. The method of making patterns, which comprises placing a master pattern in a mould and partially filling the mould with sand, completing the filling of the mould with a plastic composition, removing the sand from the mould and replacing the same with a plastic composition, removing the master pattern and then pouring a plastic material in the space between the moulds to form, when set, a moulded pattern.

In testimony whereof I have affixed my signature.

LLOYD G. COPEMAN.